J. B. CAIN.
MAIL CARRIER.
APPLICATION FILED JAN. 2, 1909.
929,120.
Patented July 27, 1909.
2 SHEETS—SHEET 2.
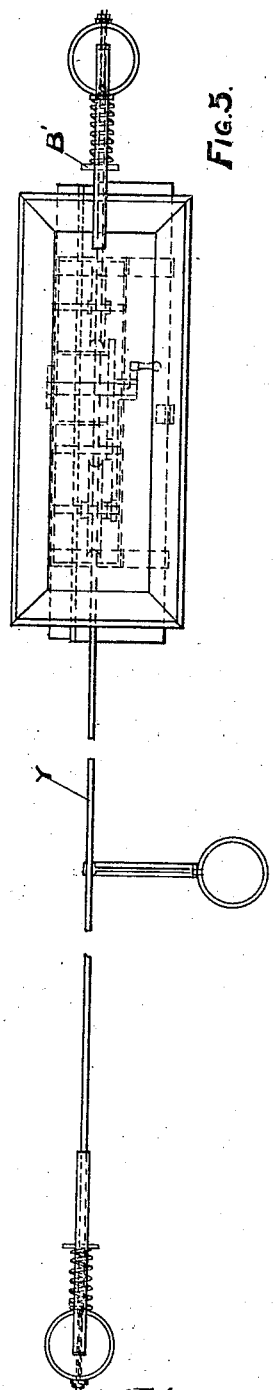
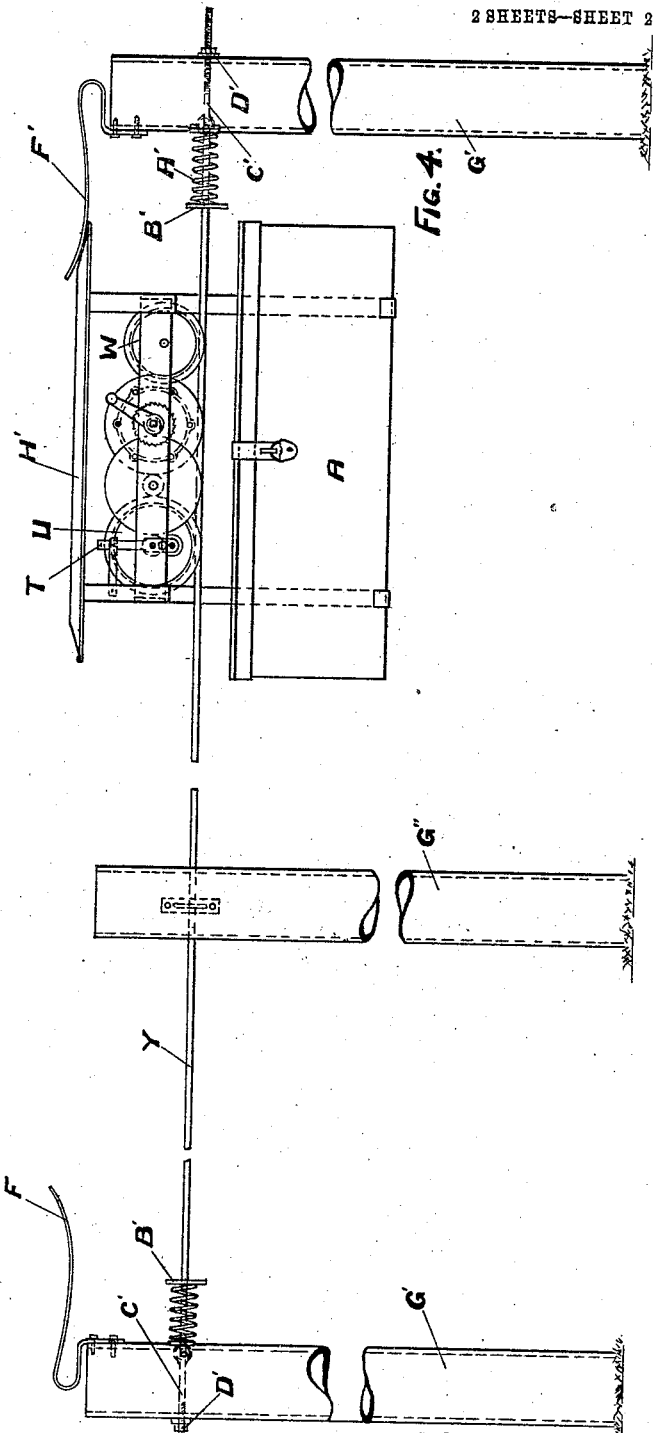
Witnesses
C. C. Cavanagh
Geo. Teickert
Inventor
John B Cain

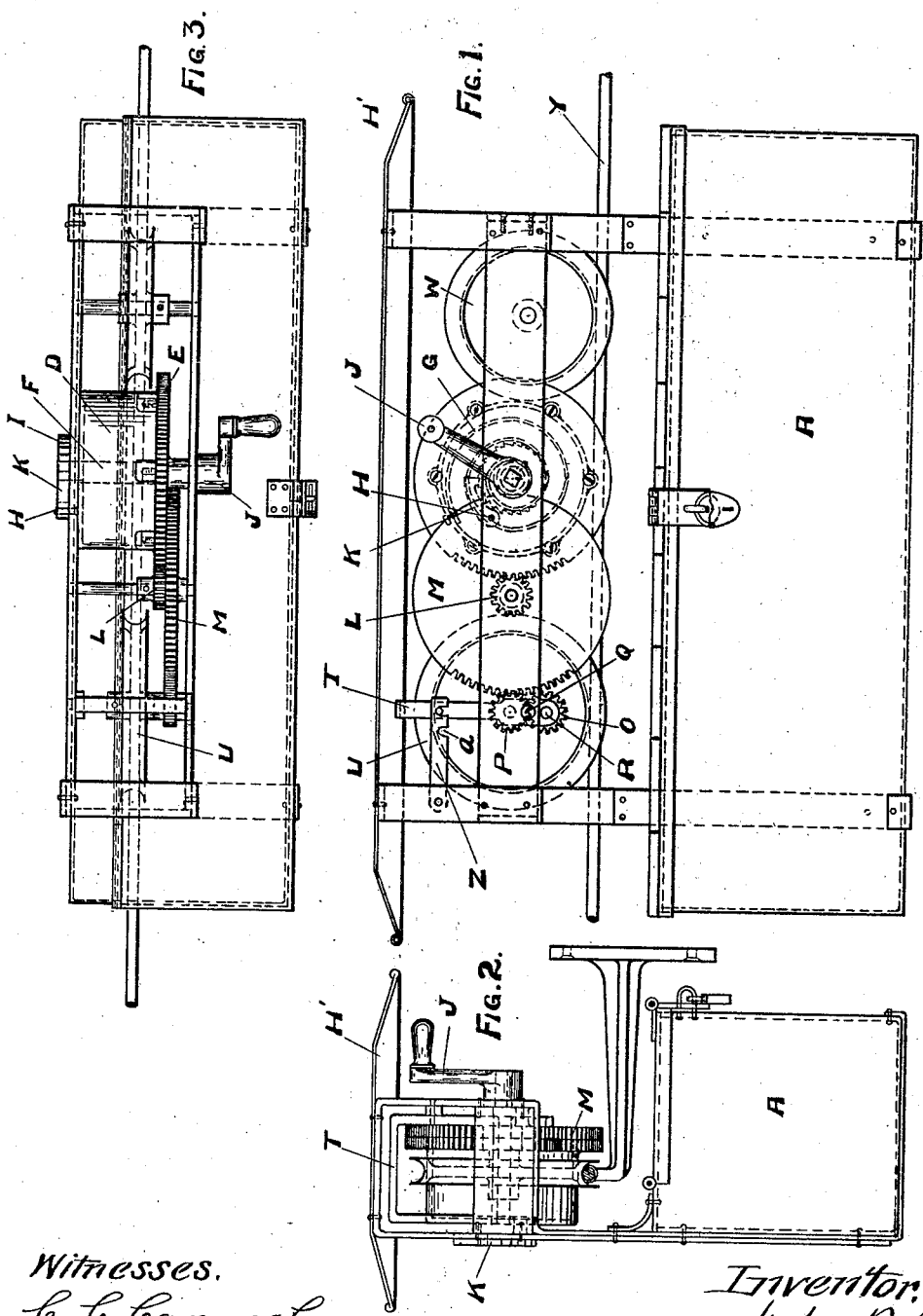

UNITED STATES PATENT OFFICE.

JOHN B. CAIN, OF FRONTENAC, MINNESOTA.

MAIL-CARRIER.

No. 929,120.     Specification of Letters Patent.     Patented July 27, 1909.

Application filed January 2, 1909. Serial No. 470,555.

*To all whom it may concern:*

Be it known that I, JOHN B. CAIN, a citizen of the United States, residing at Frontenac, in the county of Goodhue and State of Minnesota, have invented certain new and useful Improvements in Mail-Carriers, of which the following is a specification.

My invention relates to a mail carrying device particularly intended for use in the rural districts where many of the residents are situated too far from the rural delivery routes to be served by the carriers.

The object of my invention is to provide means by which these remote residents may be served by the carriers on the established routes and thus increase the benefit and service of the rural free delivery system.

My device consists of a mail box of standard size attached to a two wheel, self propelling truck, and run on a single wire cable. The truck is propelled by a spring and is adapted to run in either direction.

Referring now to the drawings: Figure 1 is a side elevation of the truck, Fig. 2 is an end elevation, and Fig. 3 is a plan view. Figs. 4 and 5 show a side elevation and plan view respectively of an elevated track construction for rural mail service.

The wheel V is the propelling wheel and the wheel W is the truck or idler wheel. The propelling wheel V is adapted to be driven in either direction by the spring G as follows: The axis of the wheel V carries the gear P and is mounted on an oscillating bracket T. The arm of the bracket T is extended to the point O and carries the gear which always engages the gear P. The bracket T has its axis of oscillation at Q and the two gears O and P are so situated that when the bracket arm T is in the position shown, the gear P will engage the gear M and when the arm of the bracket T is moved to notch *a* the gear P will then disengage M, and the gear O will then engage the gear M, and will then be an intermediate between gears M and P, which will reverse the motion of the gear P, and the wheel V related to the gear M. The gear M carries the pinion L which engages the gear E. The gear E is attached to the spring drum D. Within the spring drum D is a spiral spring G, which has one end attached to the drum D and the other to the shaft F, which has a crank J and a ratchet wheel I. The dog K is attached to the frame member B at H and is adapted to engage the ratchet I.

The spring is adapted to be wound around the shaft F by turning the crank J. The shaft F is prevented from turning back by the dog engaging the ratchet wheel. The tension of the spring now tends to propel the wheel V in either direction according to the position of the bracket arm T and thus will propel the carrier in either direction. The truck and propelling wheel of the carrier are grooved and adapted to travel on the cable Y which is supported by the posts at G', G'' and G'. The ends of the cable Y are attached to eye bolts C' and C' which pass through the posts G' and G' and are held by the nuts D' and D' and are adapted to be loosened or tightened by screwing or unscrewing the said nuts.

Near the ends of the cable Y are washers B' B', also springs A' A' are interposed between the washers B' B' and posts G' G', which form elastic stops or bumpers. On top of each of the posts G' G' is a flat spring F' so shaped that it engages and bears down on the member H' of the truck as the latter approaches the end of the cable.

The action is as follows: The carrier is held fast and the spring is wound by turning the crank J. The arm of the bracket T is put in position to run the carrier in the desired direction. The carrier is then released and the power stored in the spring will propel the carrier along the cable. As it approaches the end of the cable it is engaged by the spring bumper F' and also comes in contact with one of the spring bumpers B' B' and is gradually brought to a stop.

The parcels of mail are placed in the receiver A, the spring again wound, the motion reversed by changing the position of member T and the carrier will then run back to the other end of the cable.

I claim—

1. In a mail carrying device a truck having one propelling wheel, one truck wheel, a spiral spring connected with the propelling wheel by a train of gears, the axis of said propelling wheel mounted on an oscillating bracket, an intermediate gear mounted on the same said bracket, said intermediate gear adapted to be put in or out of said train of gears by movements of oscillating bracket, substantially as shown.

2. In a mail carrying device, an elevated cable track, a truck having one propelling and one truck wheel, a mail box attached to said truck, a spiral spring connected with the propelling wheel by a train of gears, the axis of said propelling wheel mounted on an oscillating bracket, an intermediate gear mounted on the same said bracket, the said intermediate gear adapted to be put in or out of said train of gears by movements of said oscillating bracket, substantially as shown.

3. In a mail carrying device, an elevated cable track, a truck having one propelling wheel and one truck wheel, a mail box attached to said truck, a spiral spring connected with the propelling wheel by a train of gears, the axis of said propelling wheel mounted on an oscillating bracket, an intermediate gear mounted on the same said bracket, the said intermediate gear adapted to be put in or out of said train of gears by movements of said oscillating bracket, yielding bumpers for stopping the said truck at the terminals, substantially as shown.

JOHN B. CAIN.

Witnesses:
C. C. CAVANAGH,
S. ACKERLY.